(12) United States Patent
Mikami et al.

(10) Patent No.: US 6,816,672 B2
(45) Date of Patent: Nov. 9, 2004

(54) LENS-FITTED PHOTO FILM UNIT

(75) Inventors: Yuji Mikami, Minami-Ashigara (JP); Mitsuhiro Moriya, Minami-Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/641,036

(22) Filed: Aug. 15, 2003

(65) Prior Publication Data

US 2004/0037544 A1 Feb. 26, 2004

(30) Foreign Application Priority Data

Aug. 22, 2002 (JP) ......................................... 2002-242572

(51) Int. Cl.$^7$ .............................................. G03B 17/02
(52) U.S. Cl. ............................ 396/6; 396/179; 396/502
(58) Field of Search ............................ 396/6, 179, 502

(56) References Cited

U.S. PATENT DOCUMENTS 6,549,727 B1 * 4/2003 Kamata .......................... 396/6
6,724,988 B2 * 4/2004 Mikami ....................... 396/161

FOREIGN PATENT DOCUMENTS

JP 2000-305221 11/2000

\* cited by examiner

Primary Examiner—David M. Gray
(74) Attorney, Agent, or Firm—Young & Thompson (57) ABSTRACT

An operation member is moved from a first position to a third position via a second position. When the operation member is rotated from the second position to the third position, a plate portion integrally formed with the operation member pushes and rotates a changeover ring to rotate a stop changing plate and a shutter-speed changing plate. When the operation member is kept in the second position, the plate portion is not interlocked with the changeover ring. Thus, a stop and a shutter speed are not carelessly changed if the operation member is slightly rotated by a finger. Since the stop changing plate starts to rotate at a near portion of a rotational end of the changeover ring, the stop is substantially maintained in a smaller-stop state or in a larger-stop state even if the operation member stops on its way.

13 Claims, 9 Drawing Sheets

LENS-FITTED PHOTO FILM UNIT

BACKGROUND OF THE INVENTION

1. Field of the Invention

The present invention relates to a lens-fitted photo film unit in which it is possible to select photographic modes with a single operation member. Particularly, the present invention relates to a lens-fitted photo film unit in which photographic errors to be caused by operational defect of an operation member are prevented from occurring.

2. Description of the Related Art

Various kinds of lens-fitted photo film units are sold. The lens-fitted photo film unit includes a photo film loaded at the time of manufacture thereof. In the former lens-fitted photo film unit, are fixed a stop, a shutter speed, a focal length and so forth. In this case, however, photographic conditions for taking a picture in a proper exposure are narrow. Thus, it is desired that the lens-fitted photo film unit has wide photographic conditions to take a picture of high image quality.

In consideration of the above desire, at present, are sold various kinds of the lens-fitted photo film units in which it is possible to change plural photographic modes by operating a single operation member. For instance, in these kinds of the lens-fitted photo film units, a larger stop is set at the time of flash photographing (Japanese Patent Laid-Open Publication No. 2000-305221), and plural photographic modes are provided to change a stop, a shutter speed and a flashlight amount (Japanese Patent Application No. 2002-151328).

In the lens-fitted photo film unit provided with the plural photographic modes, the operation member is generally urged to an initial position by a spring for the purposes of preventing a misuse of a user and securing positional accuracy of a mode-changing mechanism. For example, in the lens-fitted photo film unit described in the forgoing Publication No. 2000-305221, a toggle spring is put on a stop changing member to urge the associated operation member via the stop changing member.

However, since the toggle spring has a dead point, the operation member is sometimes stopped at a halfway position of switching when a user puts a finger on the operation member and foreign objects of the sand or the like enter the operation member. In case the operation member stops on the way, the stop changing member also stops on the way to switching. Thus, an appropriate stop is not obtained and photographic image quality deteriorates. Moreover, if the stop changing member stops in a state that an aperture does not exist at a photographic optical axis, it is likely to happen that nothing is photographed.

SUMMARY OF THE INVENTION

It is a primary object of the present invention to provide a lens-fitted photo film unit in which positional accuracy of an operation member is prevented from affecting a function of an exposure changing unit.

In order to achieve the above and other objects, the lens-fitted photo film unit according to the present invention comprises a plurality of exposure adjusting means, an operating means, and an urging means. Each of the exposure adjusting means changes over between a large-exposure state and a small-exposure state. The operating means moves between a first position and a second position in association with the exposure adjusting means, and is disconnected from the exposure adjusting means while the operating means is moved to a third position beyond the second position. When the operating means is kept in the first position, the exposure adjusting means is set to the large-exposure state. When the operating means is kept in the second position, the exposure adjusting means is set to the small-exposure state. The urging means urges the exposure adjusting means toward the small-exposure state.

As to a stop changing member included in the exposure adjusting means, timing thereof for interlocking with an operating means is adapted to be late in comparison with the other of the exposure adjusting means. Further, switching of the stop changing member is completed early in comparison with the other of the exposure adjusting means.

In the lens-fitted photo film unit according to the present invention, it is possible to reduce bad influence to be caused by operational defect of the operating means and to be applied to the respective exposure adjusting means. Thus, photographic errors may be prevented from occurring due to the operational defect of the operating means. As to the stop changing member which is likely to cause the photographic errors, the switching operation thereof is rapidly carried out in comparison with the other exposure adjusting means so that the bad influence is hardly drawn by the defective errors of the operating means.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
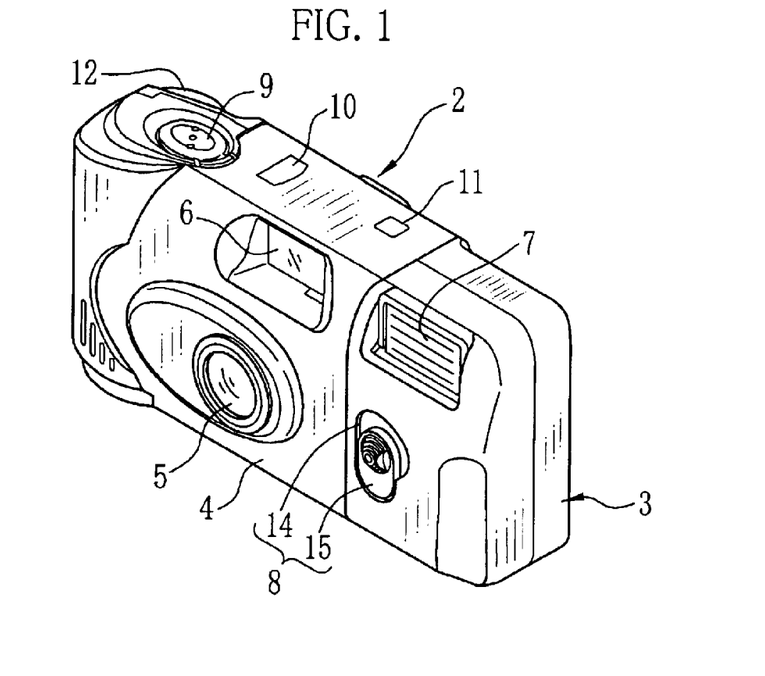
FIG. 1 is a perspective view showing a state in that a lens-fitted photo film unit according to the present invention is set to a diurnal photography mode.

FIG. 1 is a perspective view showing an external of a lens-fitted photo film unit according to the present invention. The lens-fitted photo film unit 2 comprises a unit body 3 in which various photographing mechanisms are incorporated, a film cartridge loaded at the time of manufacture of the unit body 3, and a label 4 pasted around a periphery of the unit body 3. The label 4 is formed with openings for exposing some portions of the unit body 3.

The front of the unit body 3 is provided with a taking lens 5, a view finder 6, a flash window 7, a photography-mode selector 8, and so forth. An upper face of the unit body 3 is provided with a shutter button 9, a counter indicator window 10, an opening 11 for a flash indicator, and so forth. A part of a winder wheel 12 emerges from the back of the unit body 3. The winder wheel 12 is used for winding up a photo film after taking a picture.

Figure 2:
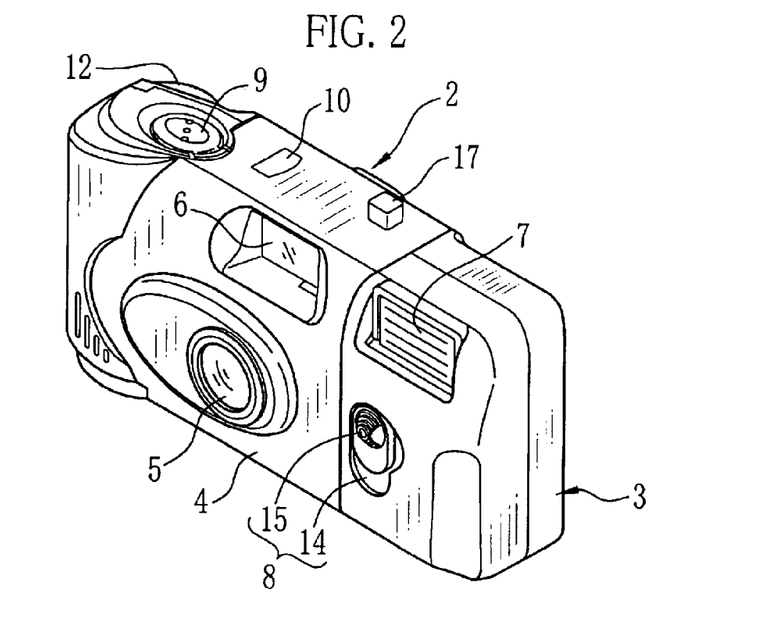
FIG. 2 is a perspective view showing a state in that the lens-fitted photo film unit is set to a diurnal synchronized-flash photography mode.
Figure 3:
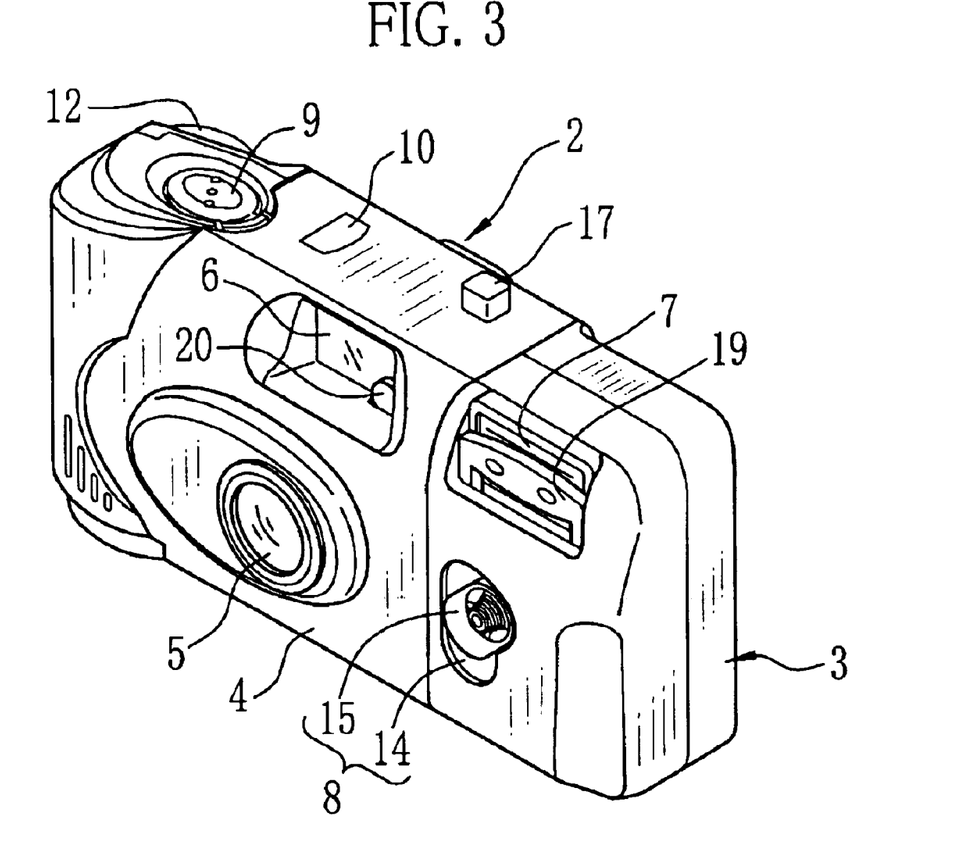
FIG. 3 is a perspective view showing a state in that the lens-fitted photo film unit is set to a nocturnal synchronized-flash photography mode.

The photography-mode selector 8 comprises an operational opening 14 and an operation member 15. The operational opening 14 is formed in the front of the unit body 3, and the operation member 15 has an ellipse-like shape and is movable within the operational opening 14. The operation member 15 is movable from a first operational position, which is a lower position of the operational opening 14, to a third operational position via a second operational position. The operation member 15 is upwardly slid from the first operational position to the second operational position, such as shown in FIG. 2. The operation member 15 is rotated in a clockwise direction from the second operational position to the third operational position, such as shown in FIG. 3.

When the operation member 15 is kept in the first operational position, the lens-fitted photo film unit 2 is set to a diurnal photography mode (first photography mode) wherein a smaller stop and a high-speed shutter are adopted and a flash is turned off. Meanwhile, when the operation member 15 is kept in the second operational position, the lens-fitted photo film unit 2 is set to a diurnal synchronized-flash photography mode (second photography mode) wherein the smaller stop and the high-speed shutter are adopted and the flash is turned on. Under the second photography mode, a flash indicator member 17 projects from the upper face of the lens-fitted photo film unit 2. The flash indicator member 17 is a light guide and guides a light of a light-emitting element, which emits the light when flash charge is completed, to the outside of the unit body 3 to notify that photographic preparation is completed.

When the operation member 15 is kept in the third operational position, a nocturnal synchronized-flash photography mode (third photography-mode) is set so as to turn on the flash and so as to adopt a larger stop and a low-speed shutter. Under the third photography mode, a light attenuator 19 is placed in front of the flash window 7 to reduce an amount of the flashlight. Meanwhile, an indication member 20 having a disk shape is placed in front of the viewfinder 6. The indication member 20 is observed inside the viewfinder 6 to notify a photographer that the lens-fitted photo film unit 2 is set to the third photography mode.

Figure 4:
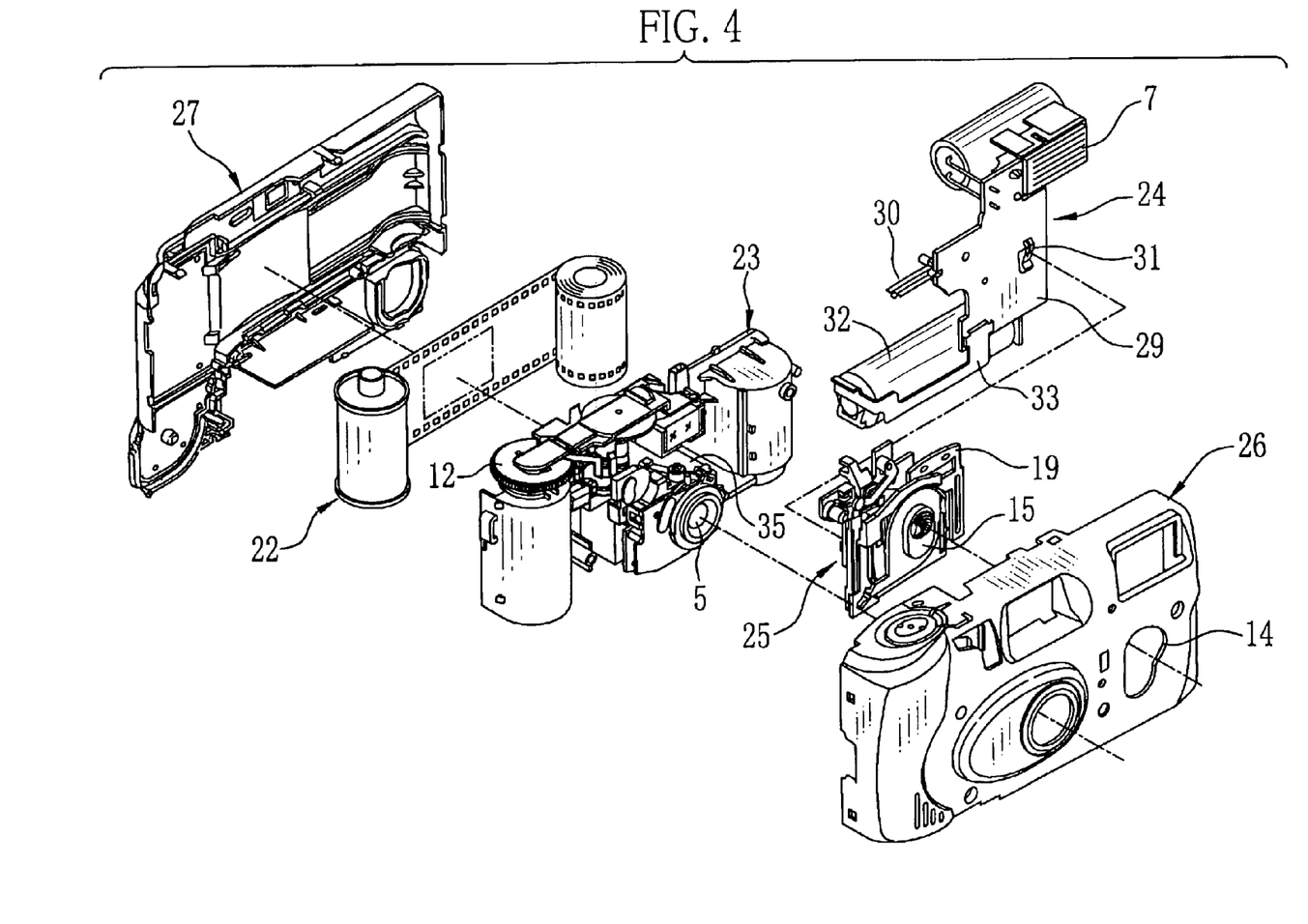
FIG. 4 is an exploded perspective view showing a structure of a unit body.

FIG. 4 is an exploded perspective view showing a structure of the unit body 3. The unit body 3 comprises a body base 23, a flash unit 24, a mode-changing mechanism 25, a front cover 26, and a rear cover 27. The body base 23 is loaded with a 135-type film cartridge 22. The flash unit 24 is attached to the front of the body base 23. The mode-changing mechanism 25 changes the photography mode. The front cover 26 and the rear cover 27 are attached to the front and the rear of the body base 23 respectively.

The flash unit 24 is constituted of a printed circuit board 29 to which various electric parts are attached to form a flash circuit, and a flash-emitting portion comprising a discharge tube, a reflector, a diffusion plate and so forth. Further, to the printed circuit board 29, are attached a synchro switch 30, a metal segment 31, a battery segment 33 and so forth. The synchro switch 30 is turned on in association with shutter release to emit the flashlight. The metal segment 31 constitutes a charging switch to be turned on and off by moving the operation member 15 of the photography-mode selector 8. The battery segment 33 connects a battery 32 to the flash circuit.

The front-center portion of the body base 23 is provided with a light-shielding box 35 around which are disposed a shutter charging mechanism, a shutter releasing mechanism, a film winding mechanism, a film-advance stopping mechanism, a film counting mechanism, a shutter-speed changing mechanism, a stop changing mechanism, a photographic optical system, a viewfinder optical system, and so forth.

Figure 5:
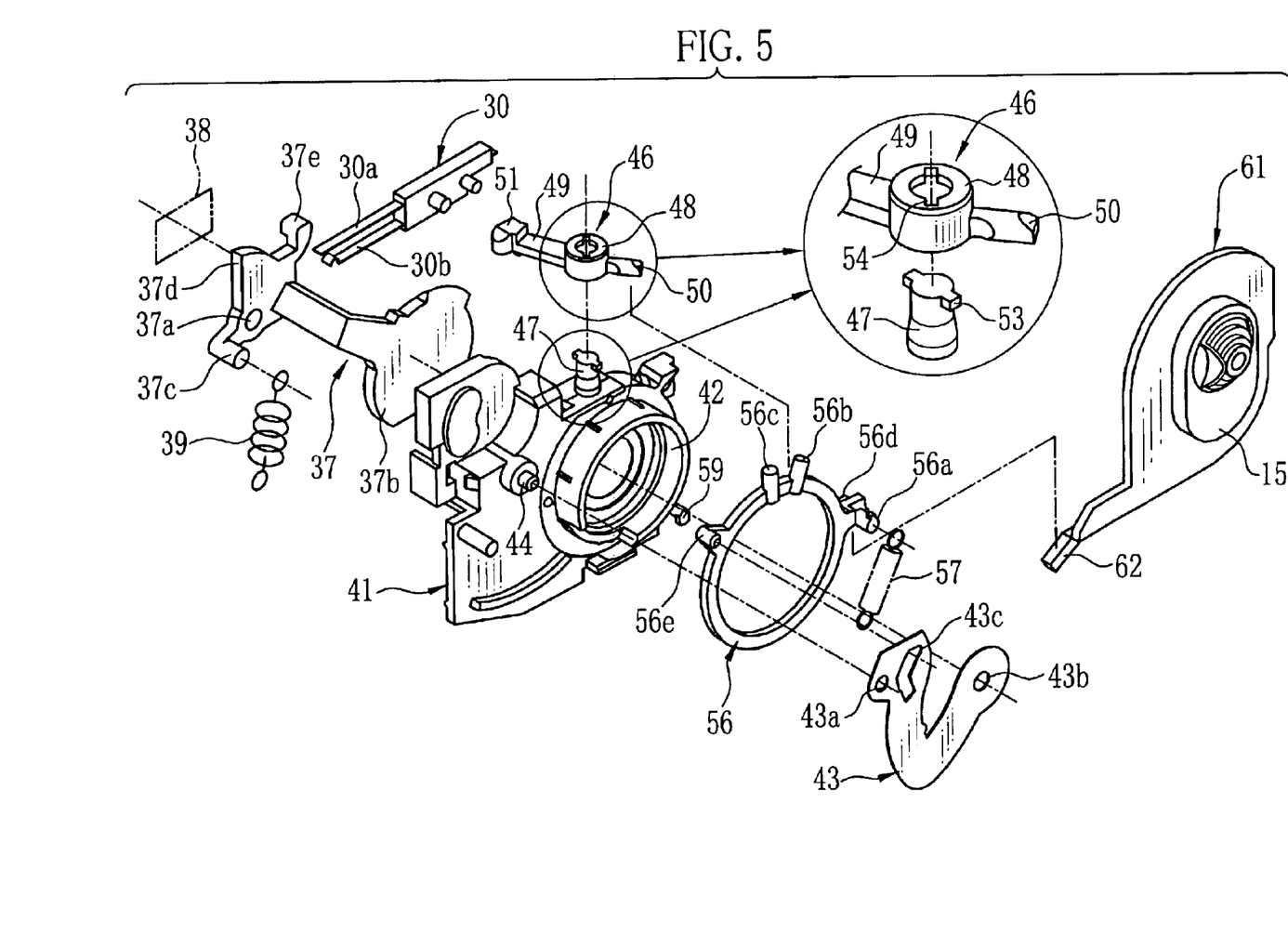
FIG. 5 is an exploded perspective view showing a structure of a stop changing mechanism and a shutter-speed changing mechanism.

FIG. 5 is an exploded perspective view showing a structure of parts relating to the stop changing mechanism and the shutter-speed changing mechanism, which are disposed around the light-shielding box 35. Reference numeral 37 denotes a shutter blade comprising an opening 37a, a blade portion 37b, a pin 37c, a ledge 37d and a synchro projection 37e. The opening 37a is pivotally attached to a pin inserted thereinto. The blade portion 37b is placed in front of an exposure aperture 38 to close it. A spring 39 is put on the pin 37c. The ledge 37d is kicked by a shutter driving lever. The synchro projection 37e actuates the synchro switch 30 of the flash unit 24.

The shutter blade 37 is urged by the spring 39 to be kept in a closed position for covering the exposure aperture 38. Upon depressing the shutter button 9, the ledge 37d is kicked by the shutter driving lever, which is not shown, from the left to the right in the drawing to rotate the shutter blade 37 in a clockwise direction against the urging force of the spring 39. Thus, the exposure aperture 38 is opened to perform photographing on the photo film.

When the shutter blade 37 is rotated to an open position, the synchro projection 37e presses an upper metal segment 30a of the synchro switch 30 to contact it with a lower metal segment 30b. Upon turning on the synchro switch 30 by contacting the couple of the metal segments 30a and 30b, the flash-emitting portion of the flash unit 24 emits the flashlight.

Reference numeral 41 denotes a lens holder for holding the taking lens and so forth. The front of the lens holder 41 is provided with a cylindrical lens barrel 42 and a pin 44. The lens barrel 42 contains the taking lens 5, a stop plate formed with the larger stop, and so forth. The pin 44 swingably supports a stop changing plate 43 having an L-like shape. The pin 44 is inserted into a hole 43a of the stop-changing plate 43 so that the stop-changing plate 43 is swingably supported in front of the lens holder 41. The stop-changing plate 43 enters the lens barrel 42 through a cut portion thereof. The stop is changed by selectively placing a smaller stop 43b at a photographic optical axis.

An upper portion of the lens holder 41 is formed with a protrusion 47 for pivotally supporting a shutter-speed changing lever 46. This changing lever 46 comprises a boss 48 to be supported by the protrusion 47, an arm 49 and a projection 50 projecting from the side of the boss 48, and a pad 51 formed at the top of the arm 49. Incidentally, although illustration is omitted, a lens holding plate for holding the taking lens 5, the stop-changing plate 43 and so forth is attached to the front of the lens holder 41.

A couple of retainers 53 are symmetrically formed at the top of the protrusion 47 of the lens holder 41. A couple of grooves 54 into which the retainers 53 are inserted are symmetrically formed in the boss 48 of the shutter-speed changing lever 46. When the shutter-speed changing lever 46 is attached to the protrusion 47, the protrusion 47 is inserted into the boss 48 so as to make the retainers 53 coincident with the grooves 54. After the retainer 53 has reached the top of the boss 48, the shutter-speed changing lever 46 is slightly rotated. Owing to this, the top of the boss 48 engages with the retainer 53 so that the shutter-speed changing lever 46 is prevented from carelessly unfastening from the lens holder 41.

Figure 6A:
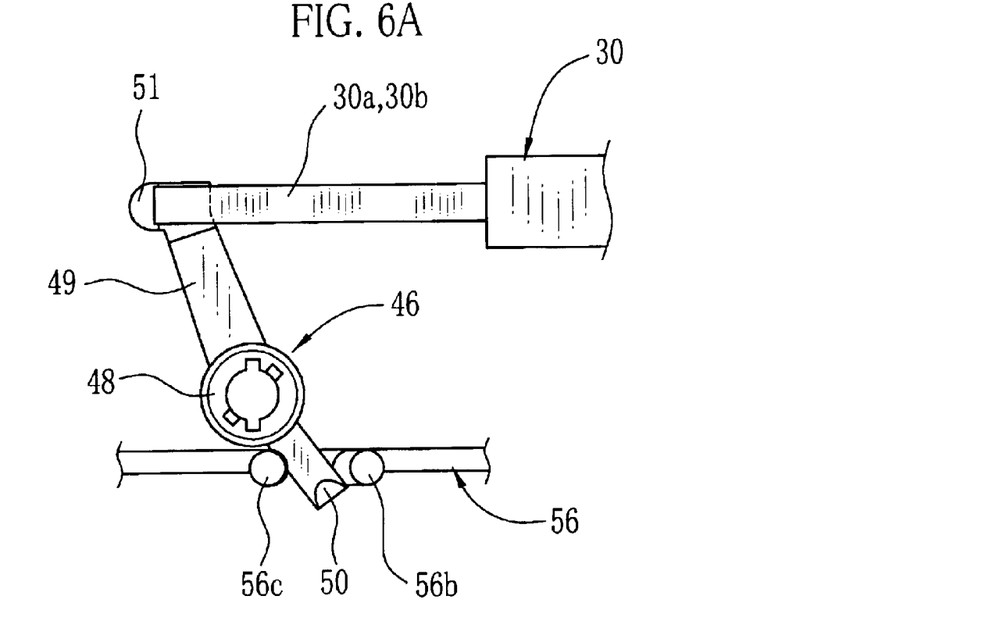
FIGS. 6A and 6B are explanatory illustrations showing setting positions of a shutter-speed changing lever.
Figure 6B:
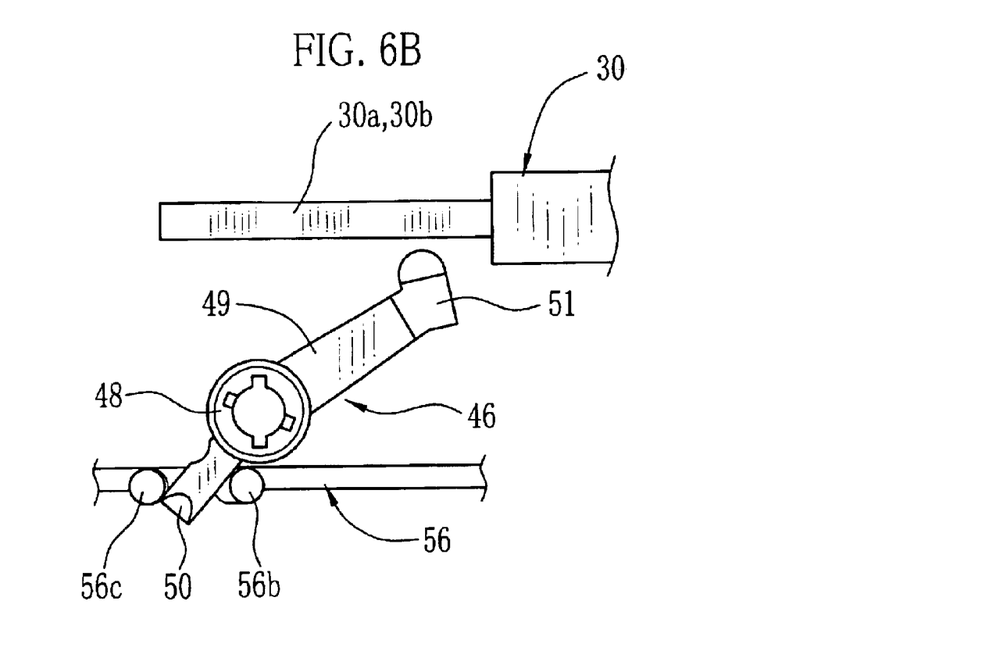

The shutter-speed changing lever 46 is rotated between a high-speed shutter position shown in FIG. 6A and a low-speed shutter position shown in FIG. 6B. In the high-speed shutter position, the pad 51 is placed under a free end of the lower metal segment 30b of the synchro switch 30 to abut thereon. In the low-speed shutter position, the pad 51 is evacuated from the under portion of the lower metal segment 30b.

When the shutter is released in the state that the pad 51 of the shutter-speed changing lever 46 is kept in the high-speed shutter position, the upper metal segment 30a of the synchro switch 30 pressed by the synchro projection 37e of the shutter blade 37 comes into contact with the lower metal segment 30b to emit the flashlight. Since the lower metal segment 30b abuts on the pad 51, the shutter blade 37 is prevented from rotating further. Thus, the shutter blade 37 is returned to the closed position in a shorter time. As to this high-speed shutter, it is possible to obtain a shutter speed of $1/120$ sec., for instance.

Meanwhile, when the pad 51 of the shutter-speed changing lever 46 is kept in the low-speed shutter position, the shutter blade 37 is largely rotated to the open position. This is caused because the metal segment 30b is elastically transformed. As a result, it takes a longer time to return the shutter blade 37 to the closed position so that the shutter speed becomes low. As to this low-speed shutter, it is possible to obtain a shutter speed of $1/45$ sec., for instance.

A changeover ring 56 is rotatably disposed around the lens barrel 42 of the lens holder 41. The changeover ring 56 is provided with a spring-hang pin 56a, a pair of bite pins 56b and 56c, and a driven pin 56d. One end of a spring 57 is put on the spring-hang pin 56a. The projection 50 of the shutter-speed changing lever 46 is interposed between the bite pins 56b and 56c. The driven pin 56d projects backward and is pushed by the mode-changing mechanism 25. Reference numeral 56e is a link pin to be inserted into a curving cam groove 43c of the stop-changing plate 43.

The other end of the spring 57 is put on a pin 59, which is formed on a front-lower portion of the lens holder 41, to urge the changeover ring 56 in a clockwise direction in the drawing. Incidentally, the changeover ring 56 urged by the spring 57 is kept in an initial position by means of the stop-changing plate 43.

Reference numeral 61 denotes a plate portion integrally formed with the operation member 15. The plate portion 61 is integrally formed with a press lever 62 horizontally projecting. When the operation member 15 is rotated from the second operational position to the third operational position, the press lever 62 upwardly pushes the driven pin 56d of the changeover ring 56. Owing to this, the changeover ring 56 is rotated in the counterclockwise direction in the drawing.

Figure 7A:
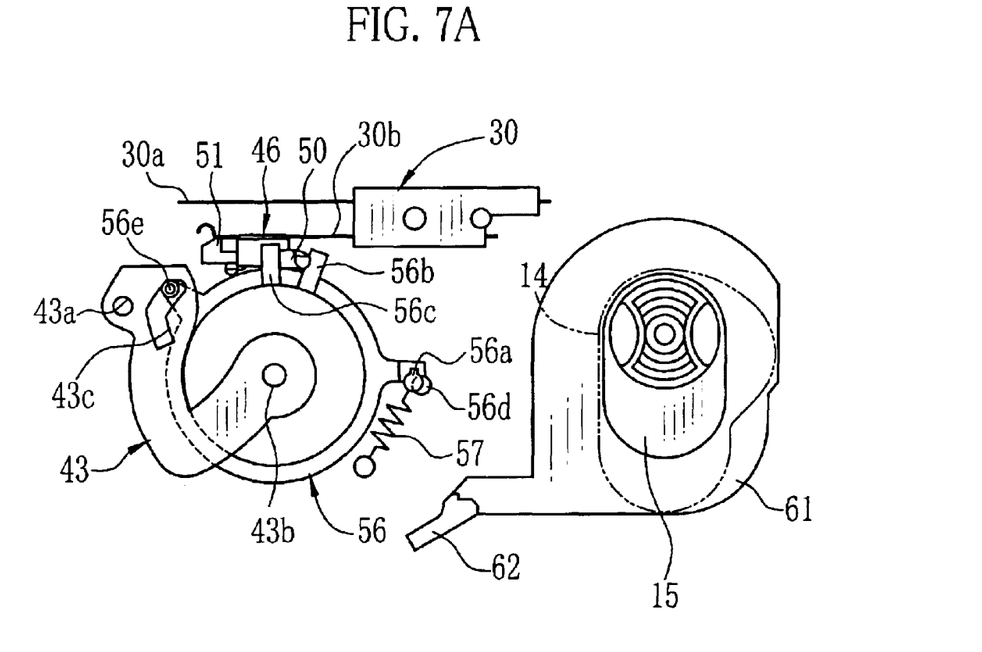
FIGS. 7A and 7B are explanatory illustrations showing the diurnal synchronized-flash photography mode and the nocturnal synchronized-flash photograph mode regarding the stop and the shutter-speed changing mechanism.

FIG. 7A shows a state of the changeover ring 56 under the second photography mode. When the operation member 15 is kept in the first and second operational positions, the press lever 62 of the operation member 15 does not come into contact with the driven pin 56d of the changeover ring 56 so that the changeover ring 56 is kept in the initial position.

When the changeover ring 56 is kept in the initial position, the stop-changing plate 43 is inserted into the lens barrel 42, and the smaller stop 43b is placed at the photographic optical axis to set the smaller-stop state. The f-number of this smaller-stop state is F14, for instance. Meanwhile, the pair of the bite pins 56b and 56c keeps the shutter-speed changing lever 46 in the high-speed shutter position.

Figure 7B:
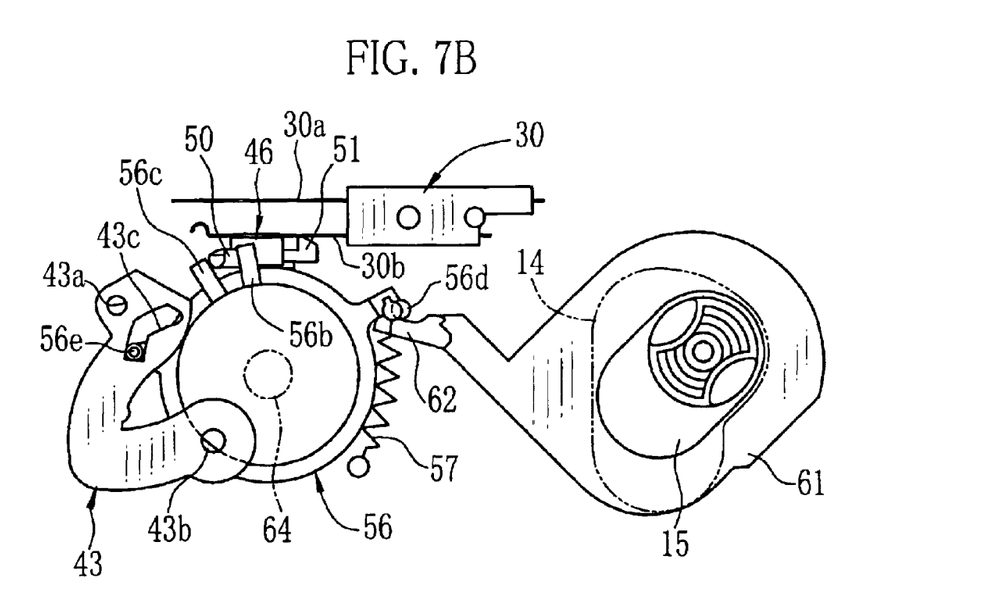

Upon rotating the operation member 15 from the second operational position to the third operational position such as shown in FIG. 7B, the press lever 62 pushes the driven pin 56d upwardly to rotate the changeover ring 56 in the counterclockwise direction in the drawing. Owing to this rotation of the changeover ring 56, the cam groove 43c is pushed by the link pin 56e and the stop-changing plate 43 is rotated in the clockwise direction to recede from the optical axis so that a larger stop 64 is set to the optical axis. In the larger-stop state, the f-number is F5.6, for instance. Meanwhile, the pair of the bite pins 56b and 56c rotates the shutter-speed changing lever 46 to place the pad 51 at the low-speed shutter position.

The cam groove 43c of the stop-changing plate 43 has a shape formed by combining two arcs, one of which is concentric with the changeover ring 56 when the stop-changing plate 43 is kept in the smaller-stop position, and the other of which is concentric with the changeover ring 56 when the stop-changing plate 43 is kept in the larger-stop position. In virtue of this, the stop-changing plate 43 hardly swings even if the changeover ring 56 is slightly rotated due to vibration, a shock, an operational error of a photographer, and so forth. Thus, it is prevented to perform photographing in a state that the stop-changing plate 43 is stopped at a halfway position.

Figure 8:
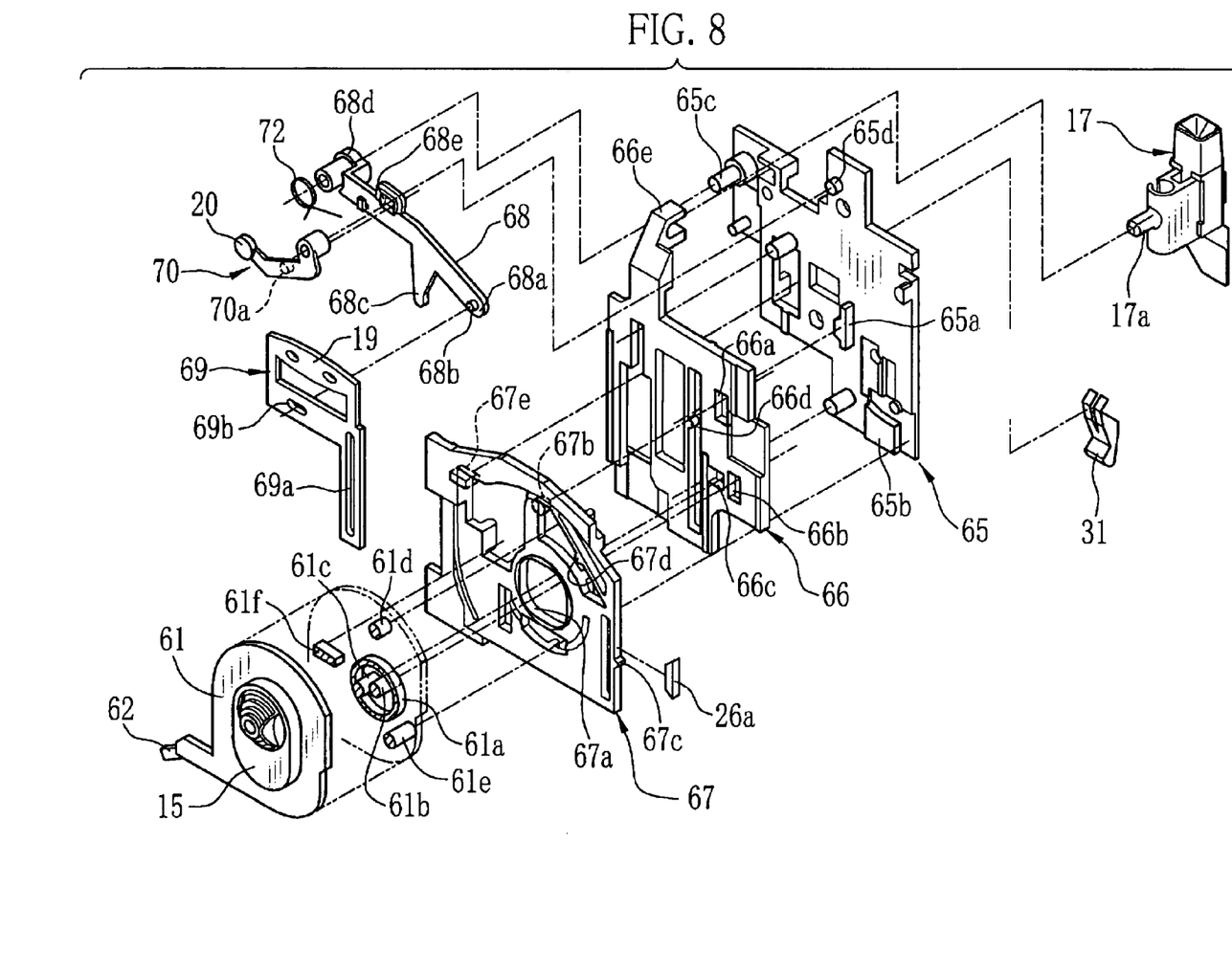
FIG. 8 is an exploded perspective view showing a structure of a photograph-mode changing mechanism.

FIG. 8 is an exploded perspective view showing a structure of the mode-changing mechanism 25. This mode-changing mechanism 25 comprises the plate portion 61, a bearing plate 67, a slide plate 66, a receiver plate 65, a light-reducing lever 68, a light reduce plate 69, and an indication lever 70. The receiver plate 65 is attached to the front of the printed circuit board 29 of the flash unit 24 so as to hold the slide plate 66 and the bearing plate 67 in a vertically slidable manner.

The back of the plate portion 61 is provided with an annular rotary guide 61a, two slide pins 61b and 61c for sliding the slide plate 66, a click pin 61d for carrying out a clicking operation at the time of rotation of the operation member 15, a guide pin 61e for guiding a moving direction of the operation member 15, and a light-reducing projection 61f for actuating the light-reducing lever 68. The two slide pins 61b and 61c are disposed inside the rotary guide 61a.

The plate portion 61 is rotatably held by inserting the rotary guide 61a into a bearing opening 67a formed in the bearing plate 67. The slide plate 66 and the bearing plate 67 are interlocked by inserting a slide pin 67b of the bearing plate 67 into a slit 66a of the slide plate 66. The plate portion 61 and the slide plate 66 are interlocked by inserting the slide pins 61b and 61c of the plate portion 61 into slits 66b and 66c of the slide plate 66 through the bearing plate 67.

Upon sliding the operation member 15 from the first operational position to the second operational position, the bearing plate 67 and the slide plate 66 are upwardly slid together as the plate portion 61 is interlocked with the bearing plate 67, and besides the bearing plate 67 is interlocked with the slide plate 66. Upon rotating the operation member 15 from the second operational position to the third operational position, the slide pin 61c of the plate portion 61 further slides the slide plate 66 upward. Since the guide pin 61e moves along a guide cam 65b of the receiver plate 65, sliding and a rotational track of the plate portion 61 are stable.

The receiver plate 65 and the slide plate 66 are provided with a first click-stop mechanism for keeping the slide plate 66, which is upwardly slid, in the current position. The first click-stop mechanism comprises an engaging projection 65a and an elastic projection 66d, which are formed on the receiver plate 65 and the slide plate 66 respectively.

A second click-stop mechanism is provided between the bearing plate 67 and the front cover 26. The second click-stop mechanism comprises an elastic projection 67c formed on the bearing plate 67, and an engaging projection 26a formed inside the front cover 26. By means of the second click-stop mechanism, the bearing plate 67 upwardly slid is kept in the current position.

The plate portion 61 and the bearing plate 67 are provided with a third click-stop mechanism which keeps the plate portion 61 in the current position when the operation member 15 is rotated to the third operational position. The third click-stop mechanism also keeps the slide plate 66 slid to a position higher than the second operational position. The third click-stop mechanism comprises the click pin 61d of the plate portion 61 and an elastic projection 67d of the bearing plate 67.

The slide plate 66 is provided with an engagement portion 66e for engaging with an engagement pin 17a of the flash indicator member 17. When the operation member 15 is kept in the first operational position, the flash indicator member 17 is contained in the unit body 3. Upon moving the operation member 15 to the second operational position, the flash indicator member 17 projects from the upper face of the unit body 3 in association with sliding of the slide plate 66. Successively, upon rotating the operation member 15 to the third operational position, the slide plate 66 is further slid upward so that the projection amount of the flash indicator member 17 increases.

The back of the bearing plate 67 is provided with a pressure segment 67e, which presses the metal segment 31 of the charge switch of the flash unit 24 through the slide plate 66 and the receiver plate 65 when the operation member 15 is kept in the second operational position or in the third operational position.

The receiver plate 65 is provided with pins 65c and 65d to which the light-reducing lever 68 and the indication lever 70 are rotatably attached. A torsion spring 72 is attached to a periphery of a boss 68d of the light-reducing lever 68 attached to the pin 65c. One end of the torsion spring 72 is put on the light-reducing lever 68 and the other end thereof is put on the receiver plate 65 to urge the light-reducing lever 68 in the clockwise direction in the drawing. In other words, the light-reducing lever 68 is urged in a direction for containing the light attenuator 19 in the unit body 3.

The light reduce plate 69 is formed with a vertical ellipse hole 69a and a horizontal ellipse hole 69b, which are positioned under the light attenuator 19. Into the vertical ellipse hole 69a, are inserted a plurality of pins formed on an inner wall of the front cover 26 and positioned under the flash emitting portion. By means of these pins, the light reduce plate 69 becomes slidable inside the front cover 26 in the vertical direction. Into the horizontal ellipse hole 87b, is inserted a link pin 68b formed on an end 68a of the light-reducing lever 68.

Figure 9:
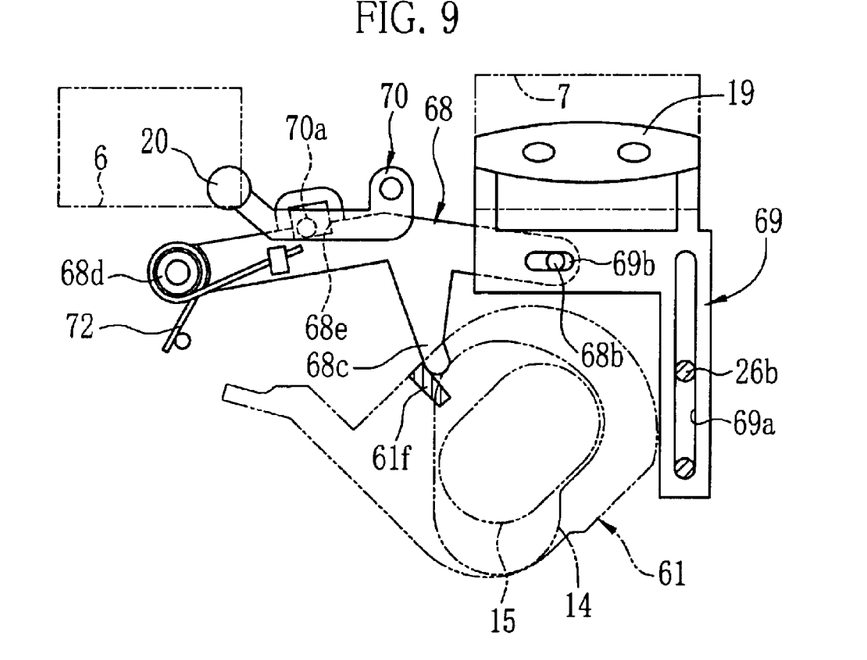
FIG. 9 is an explanatory illustration showing the nocturnal synchronized-flash photography mode of the photography-mode changing mechanism.

As shown in FIG. 9, when the operation member 15 is moved to the third operational position, a lift segment 68c is pushed by the light-reducing projection 61f, which is integrally formed with the plate portion 61, so that the light-reducing lever 68 is rotated in the counterclockwise direction in the drawing. At this time, the link pin 68b raises the light reduce plate 69 to place the light attenuator 19 in front of the flash window 7. A projection 70a is pushed by a link opening 68e of the light-reducing lever 68 so that the indication lever 70 is rotated in the clockwise direction in the drawing to place the indication member 20 in front of the viewfinder 6.

The stop and the shutter speed are changed between the second operational position and the third operational position. If the operation member 15 stops between the second operational position and the third operational position due to vibration, a shock, operational errors, and clogs of a foreign object and so forth, an appropriate aperture is not obtained and photographic image quality deteriorates. Moreover, if photographing is performed in a state that the aperture of the stop-changing plate does not exist at a photographic optical axis, it is likely to happen that nothing is photographed. Further, sometimes the shutter speed becomes unstable, and synchronization errors of flash sometimes occur.

In view of the above, in the present embodiment, the plate portion 61 is urged by the torsion spring 72 from the third operational position toward the second operational position via the light-reducing lever 68. In virtue of this, it is possible to move the operation member 15 to the second operational position by the pressure of the light-reducing lever 68 even if actuation of the operation member 15 is canceled between the second operational position and the third operational position.

The plate portion 61 is interlocked with the changeover ring 56 after the operation member 15 has approached the third operational position. Even if the plate portion 61 is slightly rotated by a finger put on the operation member 15 of the second operational position, the changeover ring 56 is never rotated in this state. Thus, the stop and the shutter speed are prevented from changing. The light-reducing lever 68 is interlocked with the plate portion 61 in association with the movement of the operation member 15 directing to the second operational position. However, if a position of the light attenuator 19 is sifted, a lower portion of the flash window 7 is merely hidden. Accordingly, a picture to be taken is not greatly affected.

Figure 10:
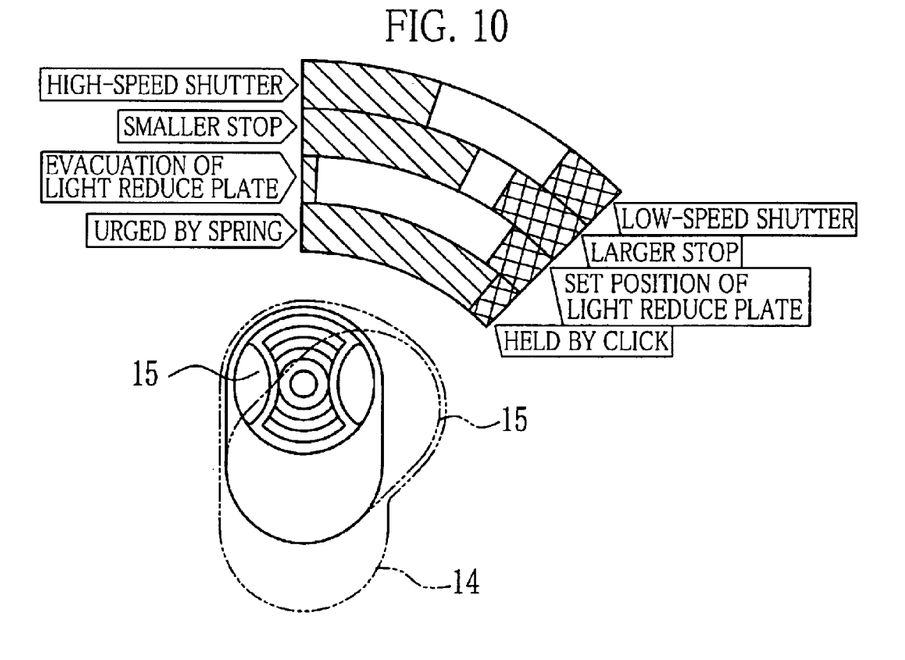
FIG. 10 is a timing chart showing operation timing of the respective changing mechanisms in association with a rotation of the operation member.

FIG. 10 is a timing chart, which shows timing for actuating the shutter-speed changing mechanism, the stop changing mechanism, and the flashlight-amount changing mechanism in accordance with the operation member 15 rotating between the second operational position and the third operational position. These changing mechanisms are respectively regarded as one of exposure changing mechanisms.

Figure 11:
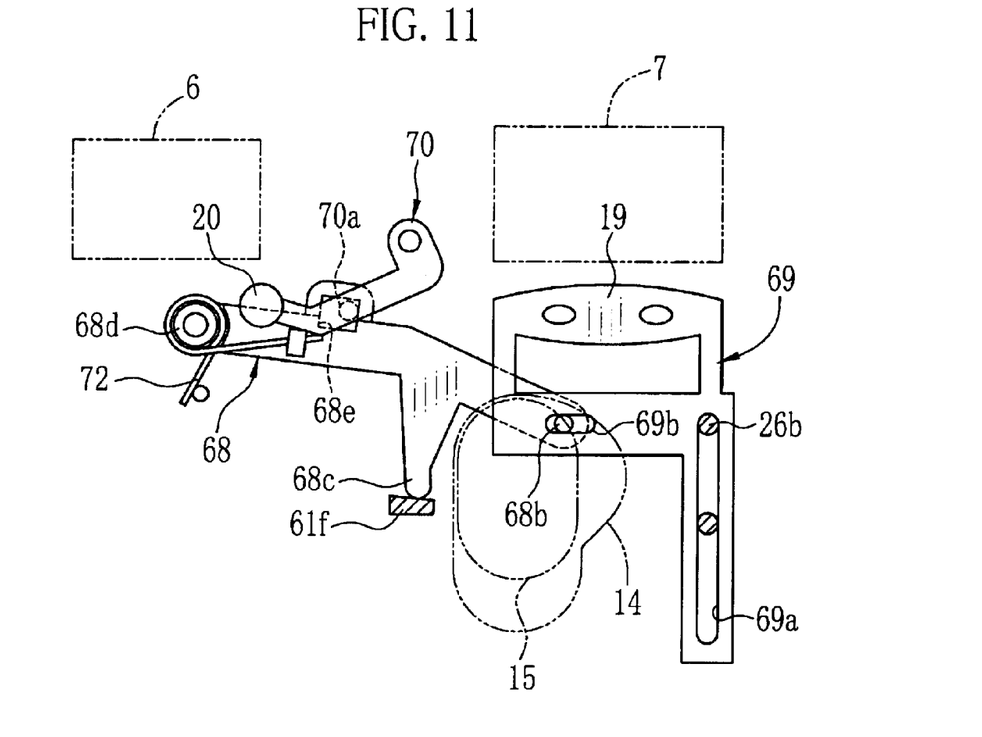
FIG. 11 is an explanatory illustration showing the diurnal synchronized-flash photography mode of the photograph-mode changing mechanism.

The lowermost tier of the timing chart represents an urged state of the operation member 15. An oblique-line region of this tier represents the state in that the operation member 15 is urged toward the second operational position. A latticed-line region of this tier represents a click state of the operation member 15. Such as shown in FIG. 11, upon sliding the operation member 15 to the second operational position, the light-reducing projection 61f abuts on the lift segment 68c of the light-reducing lever 68. Thus, the operation member 15 is urged by the torsion spring 72 toward the second operational position. Upon rotating the operation member 15 to the third operational position, the click pin 61d formed on the back of the plate portion 61 engages with the elastic projection 67d of the bearing plate 67 to be held such as described above.

The second tier from the bottom of the timing chart represents a state of the flashlight-amount changing mechanism. An oblique-line region of this tier represents the state in that the light attenuator 19 is completely evacuated into the unit body 3. A latticed-line region of this tier represents that the light attenuator 19 is placed at a predetermined position in front of the flash window 7. A plain region between the oblique-line region and the latticed-line region represents a section where the light-reducing lever 68, the light reduce plate 69 and the light attenuator 19 are moved in association with the rotation of the operation member 15.

The third tier from the bottom of the timing chart represents a state of the stop changing mechanism. An oblique-line region of this tier represents that the stop-changing plate 43 is set to the smaller-stop position. A latticed-line region of this tier represents that the stop-changing plate 43 is set to the larger-stop position. A plain region between the oblique-line region and the latticed-line region represents a section where the stop-changing plate 43 is rotated between the smaller-stop position and the larger-stop position.

The outermost tier of the timing chart represents a state of the shutter-speed changing mechanism. An oblique-line region of this tier represents that the shutter-speed changing lever 46 is kept in the high-speed shutter position. A latticed-line region of this tier represents that the shutter-speed changing lever 46 is kept in the low-speed shutter position. A plain region between the oblique-line region and the latticed-line region represents a section where the shutter-speed changing lever 46 is rotated between the high-speed shutter position and the low-speed shutter position.

Figure 12:
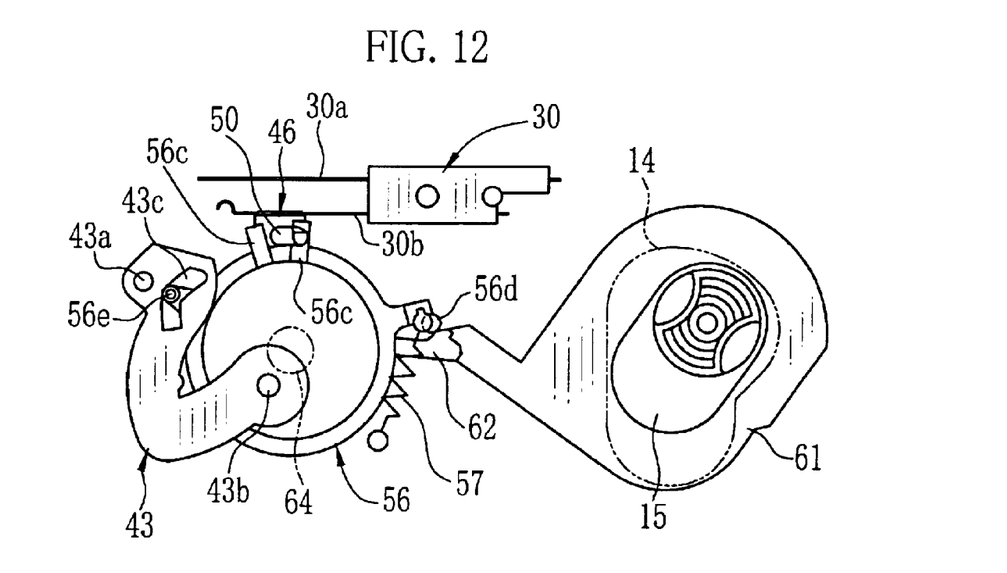
FIG. 12 is an explanatory illustration showing a halfway state of changing the diurnal and nocturnal synchronized-flash photography modes of the stop and the shutter-speed changing mechanism.

As will be understood from the timing chart, a switching operation of the stop changing mechanism is adapted to start late in comparison with the shutter-speed changing mechanism and the flashlight-amount changing mechanism when the operation member 15 is rotated from the second operational position to the third operational position. Meanwhile, such as shown in FIG. 12, when the link pin 56e of the changeover ring 56 reaches the curving portion of the cam groove 43c of the stop-changing plate 43, switching of the stop-changing plate 43 is completed by slightly rotating the changeover ring 56. Thus, an operational section for switching the stop-changing mechanism is extremely short. For this reason, the switching operation of the stop-changing mechanism is completed early in comparison with the shutter-speed changing mechanism and the flashlight-amount changing mechanism.

In virtue of the above structure, the stop-changing mechanism is effectively maintained in the smaller-stop state or in the larger-stop state even if the rotation of the operation member 15 is stopped halfway due to a clog of a foreign object. Therefore, it is possible to reduce occurrence of photographic errors caused by halfway stoppage of the stop-changing plate 43.

In the above embodiment, the lens-fitted photo film unit is described as an example. The present invention, however, may be adopted to a camera and so forth having a similar structure with the lens-fitted photo film unit.

Although the present invention has been fully described by way of the preferred embodiments thereof with reference to the accompanying drawings, various changes and modifications will be apparent to those having skill in this field. Therefore, they should be construed as included the present invention.

What is claimed is:

1. A lens-fitted photo film unit being capable of adjusting an exposure, comprising:
    a plurality of exposure adjusting means for independently adjusting an exposure amount, said exposure adjusting means respectively changing over between a large-exposure state and a small-exposure state;
    operating means for actuating said exposure adjusting means, said operating means being moved between a first position and a second position in association with said exposure adjusting means and being disconnected from said exposure adjusting means when said operating means is moved to a third position beyond the second position, said exposure adjusting means being set to the large-exposure state when said operating means is kept in the first position, and said exposure adjusting means being set to the small-exposure state when said operating means is kept in the second position; and
    urging means for urging said exposure adjusting means toward the small-exposure state.

2. A lens-fitted photo film unit according to claim 1, wherein one of said exposure adjusting means includes a stop device for changing a stop between a larger stop and a smaller stop, timing of said stop device for connecting with said operating means being late in comparison with the other exposure adjusting means, and switching of said stop device being completed early in comparison with the other exposure adjusting means.

3. A lens-fitted photo film unit according to claim 2, wherein one of said exposure adjusting means includes a speed changing device for changing a shutter speed of a shutter blade, which opens an exposure aperture, from a high speed to a low speed.

4. A lens-fitted photo film unit according to claim 3, wherein one of said exposure adjusting means further includes a flash light reduce device for reducing a flash-light amount emitted from a flash window.

5. A lens-fitted photo film unit according to claim 4, wherein said operating means comprises:
    an operation member to be moved by a finger of a photographer;
    a plate portion integrally formed with said operation member; and
    a press lever integrally formed with said plate portion.

6. A lens-fitted photo film unit according to claim 5, wherein said stop device comprises:
    a changeover ring for engaging with said press lever, said changeover ring being rotated by said press lever; and
    a stop plate to be rotated by a link pin formed on said changeover ring, said stop plate being formed with an aperture of said smaller stop, which is placed at a photographic optical axis to set a state of said smaller stop.

7. A lens-fitted photo film unit according to claim 6, wherein said press lever engages with a driven pin formed on said changeover ring.

8. A lens-fitted photo film unit according to claim 6, wherein said link pin of said changeover ring engages with a cam groove formed in said stop plate.

9. A lens-fitted photo film unit according to claim 8, wherein said cam groove has a shape formed such that a first arc, which is concentric with said changeover ring at the time of the small-exposure state, connects with a second arc, which is concentric with the changeover ring at the time of the large-exposure state.

10. A lens-fitted photo film unit according to claim 6, wherein said urging means is a spring put on said changeover ring.

11. A lens-fitted photo film unit according to claim 10, wherein said speed changing device comprises:

an arm to be rotated by a pair of bite pins formed on said changeover ring, said arm preventing a rotation of said shutter blade on its way in the small-exposure state to set the shutter speed to the high speed.

12. A lens-fitted photo film unit according to claim 11, wherein said flash light reduce device comprises:

a light-reducing projection provided on said plate portion;

a light-reducing lever to be rotated by said light-reducing projection;

a light reduce plate for engaging with a link pin formed on said light-reducing lever, said light reduce plate being vertically slid by said link pin; and a light reduce portion to be placed in front of said flash window in association with sliding of said light reduce plate.

13. A lens-fitted photo film unit according to claim 1, wherein said operating means is arranged at the front of said lens-fitted photo film unit.

* * * * *